United States Patent [19]
Furlani et al.

[11] Patent Number: 5,909,411
[45] Date of Patent: Jun. 1, 1999

[54] MAGNETICALLY COUPLED APPARATUS FOR INVERTING A BIAS FIELD FOR MAGNETO-OPTIC RECORDING AND ERASING

[75] Inventors: Edward P. Furlani, Lancaster; Christopher C. Williams, Livonia; Syamal K. Ghosh, Rochester, all of N.Y.

[73] Assignee: Eastman Kodak Company, Rochester, N.Y.

[21] Appl. No.: 09/048,439

[22] Filed: Mar. 26, 1998

[51] Int. Cl.⁶ .................................................. G11B 13/04
[52] U.S. Cl. ................................. 369/13; 360/114; 360/59
[58] Field of Search ................................. 369/13, 14, 15, 369/110, 59, 116, 124; 360/59, 116; 428/696 ML, 696 MM

[56] References Cited

U.S. PATENT DOCUMENTS 5,072,432 12/1991 Tanaka ...................................... 369/13
5,570,329 10/1996 Furlani ..................................... 369/13
5,768,220 6/1998 Williams et al. ........................ 369/13

*Primary Examiner*—Ali Neyzari
*Attorney, Agent, or Firm*—Peyton C. Watkins

[57] ABSTRACT

A bias-field apparatus for a magneto-optical system having a magneto-optical recording element which includes a conductive substrate and which moves through a magnetic field created by the bias-field device so that information is selectively recorded on or erased from the recording element, the device comprises a support member; a magnet mounted for rotation in the support member such that, when the recording element rotates, the conductive substrate creates a magnetic coupling with the magnet for causing the magnet to rotate; and (c) a ferromagnetic element enclosing a portion of said magnet and having a plurality of spatially separated pole teeth, each of said pole teeth having an operably connected coil disposed thereon that releases said magnet for rotation caused by the conductive substrate when the coil is energized, and prevents rotation when said coil is de-energized for permitting said magnet to be selectively rotated.

12 Claims, 4 Drawing Sheets

MAGNETICALLY COUPLED APPARATUS FOR INVERTING A BIAS FIELD FOR MAGNETO-OPTIC RECORDING AND ERASING

CROSS-REFERENCE TO RELATED APPLICATIONS

This application is related to U.S. application Ser. No. 08/800,347 entitled "A Motorless Bias-Field Device and Method having Magnetic Coupling Between A Magnet and the Recording Element for Inverting the Magnetic Field" by Christopher Williams et. al. and U.S. application Ser. No. 09/045,410 entitled "A Magnet Drive and Bias Field Apparatus for Inverting A Bias Field Magneto-Optic Recording and Erasing" by Edward Furlani et. al. filed on Mar. 20, 1998.

FIELD OF THE INVENTION

The invention relates generally to the field of magneto-optic recording and erasing and, more particularly, to such recording and erasing utilizing a motorless bias-field device for selectively inverting a bias field for permitting such recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature. The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. One pole of the magnet is placed adjacent the recording medium for inducing its particular magnetic field to the recording medium, and when the coil is energized, the field that the coil creates imparts a torque to the magnet forcing it to rotate for causing the other pole of the magnet to be adjacent the recording medium.

Although the presently known and utilized device is satisfactory, it is not without drawbacks. The coils are not energy efficient because they consume a substantial amount of energy.

Consequently, a need exists in the construction and mode of operating the bias-field device for overcoming the above-described drawbacks.

SUMMARY OF THE INVENTION

The present invention is directed to overcoming one or more of the problems set forth above. Briefly summarized, according to one aspect of the present invention, the invention resides in a bias-field apparatus for a magneto-optical system having a magneto-optical recording element which includes a conductive substrate and which moves through a magnetic field created by the bias-field device so that information is selectively recorded on or erased from the recording element, the device comprising: (a) a support member; (b) a magnet mounted for rotation in said support member such that,. when the recording element rotates, the conductive substrate creates a magnetic coupling with the magnet for causing said magnet to rotate; and (c) a ferromagnetic element enclosing a portion of said magnet and having a plurality of spatially separated pole teeth, each of said pole teeth having an operably connected coil disposed thereon that releases said magnet for rotation caused by the conductive substrate when the coil is energized, and prevents rotation when said coil is de-energized for permitting said magnet to be selectively rotated.

It is an object of the present invention to provide a bias-field device for overcoming the above-described drawbacks.

It is also an object of the present invention to provide an energy efficient and motorless bias field device.

It is an advantage of the present invention to provide a cost efficient bias-field device.

It is a further advantage of the present invention to provide a bi-directional bias-field device for selectively inverting the magnetic bias field.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
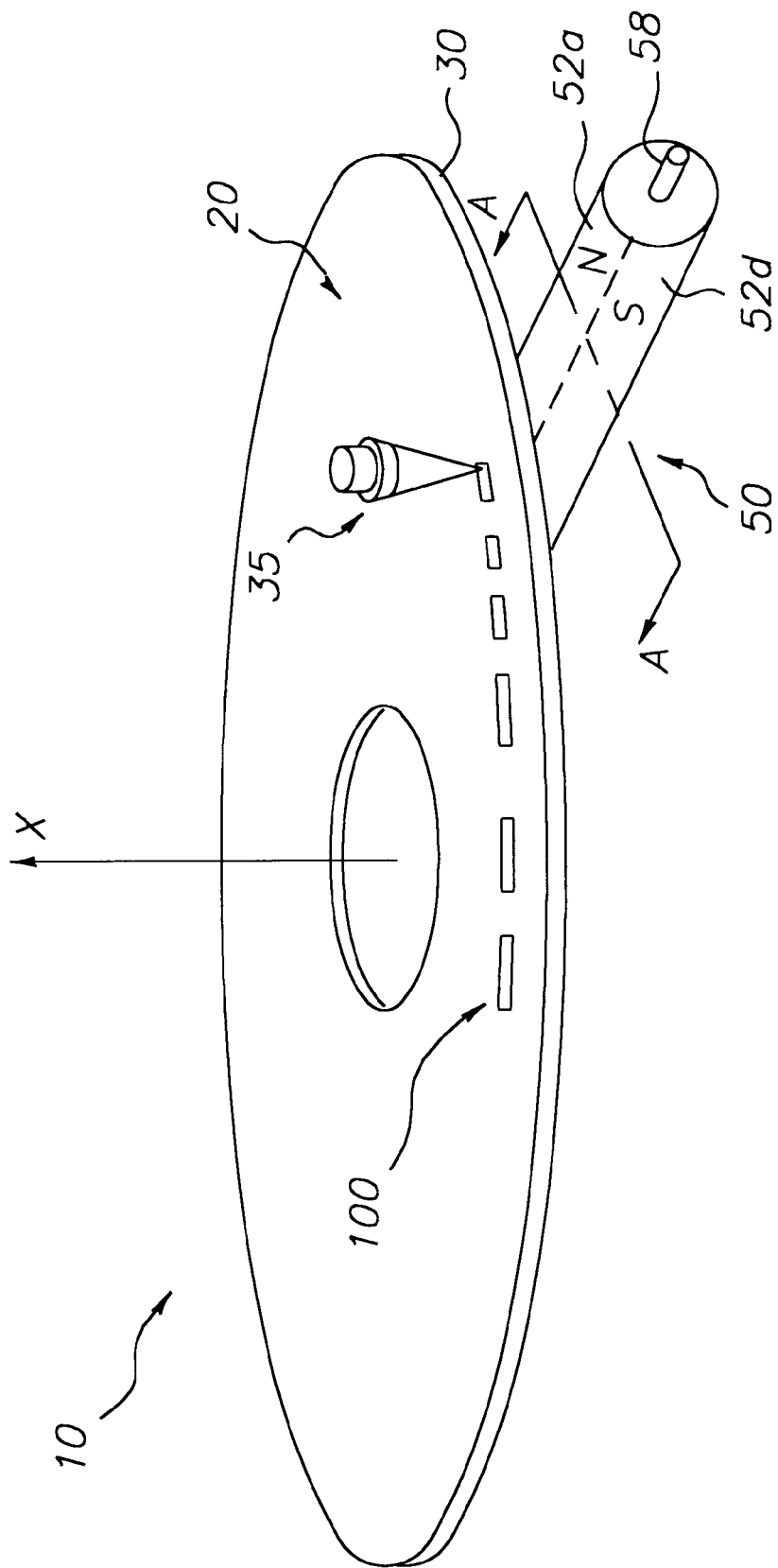
FIG. 1A is a perspective view of a magneto-optic recording element and a bias magnet of the present invention.
Figure 1B:
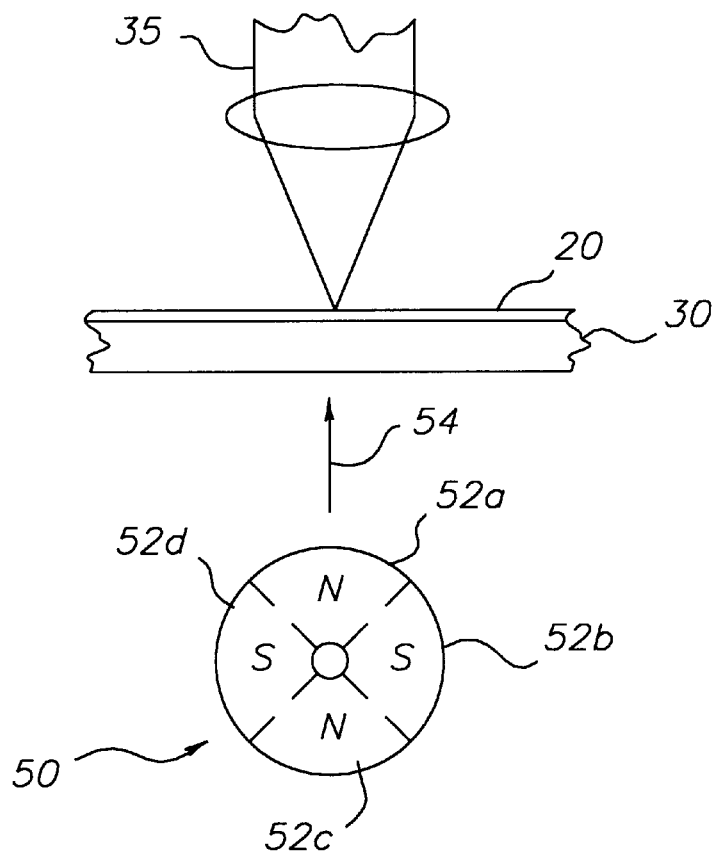
FIG. 1B is a cross-sectional view taken along line A—A of FIG. 1A.

Referring to FIGS. 1A and 1B, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. An elongated permanent magnet 50 is radially disposed with respect to the rotating disk 10, and serves to produce a magnetic bias field. The magnet 50 includes a plurality of poles and, for purposes of example, illustrates four poles 52a, 52b, 52c, and 52d in the preferred embodiment (FIG. 1B). Magnet 50 is mounted for rotation about its longitude axis so that the direction of the bias field may be switched from the upward direction indicated by field vector 54 in FIG. 1B with pole 52a directly beneath the disk to a downward direction in which the magnet 50 is rotated so that either pole 52b or 52d is directly beneath the disk 10. The amount of rotation depends on the number of poles in magnet 50. For the 4 pole magnet 50 shown in FIG. 1, a 90 degree rotation is required. A magnetic drive mechanism 90 (not shown, see FIGS. 2A and 2B) is in operative relation to the magnet 50 for causing rotation as will be described. The magnet 50 will cause magnetic domains in the recording element to flip orientations, from upward to downward, whenever the laser beam intensity is at its high level. In this manner, the digital information provided by the laser source 35 is magnetically recorded in the recording layer 20. To erase the previously recorded information in the recording layer 20, the direction of the magnetic bias field is inverted, or in other words, the magnet 50 is rotated 90 degrees in this embodiment. After the field inversion, the laser source 35 scans the recording element while its intensity is maintained at its high level and, while so radiated, all of the magnetic domains align themselves with the bias field thereby providing a uniformly sensitized disk or track which is again ready to record information.

Figure 2B:
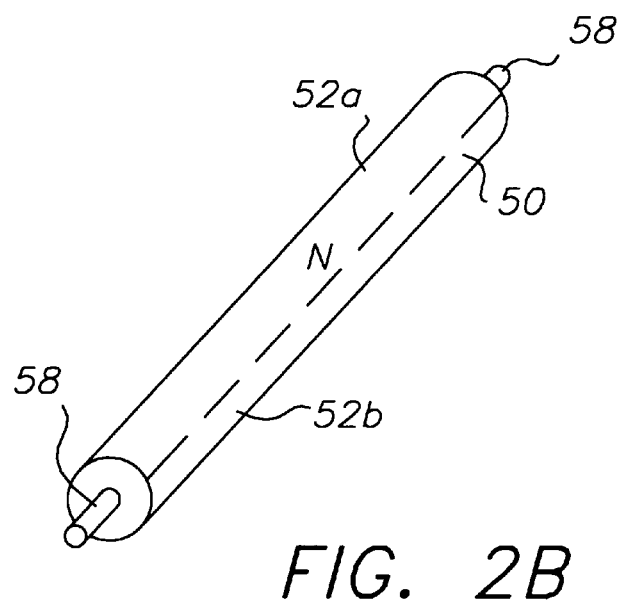
FIG. 2B is a perspective view of the bias magnet.
Figure 2A:
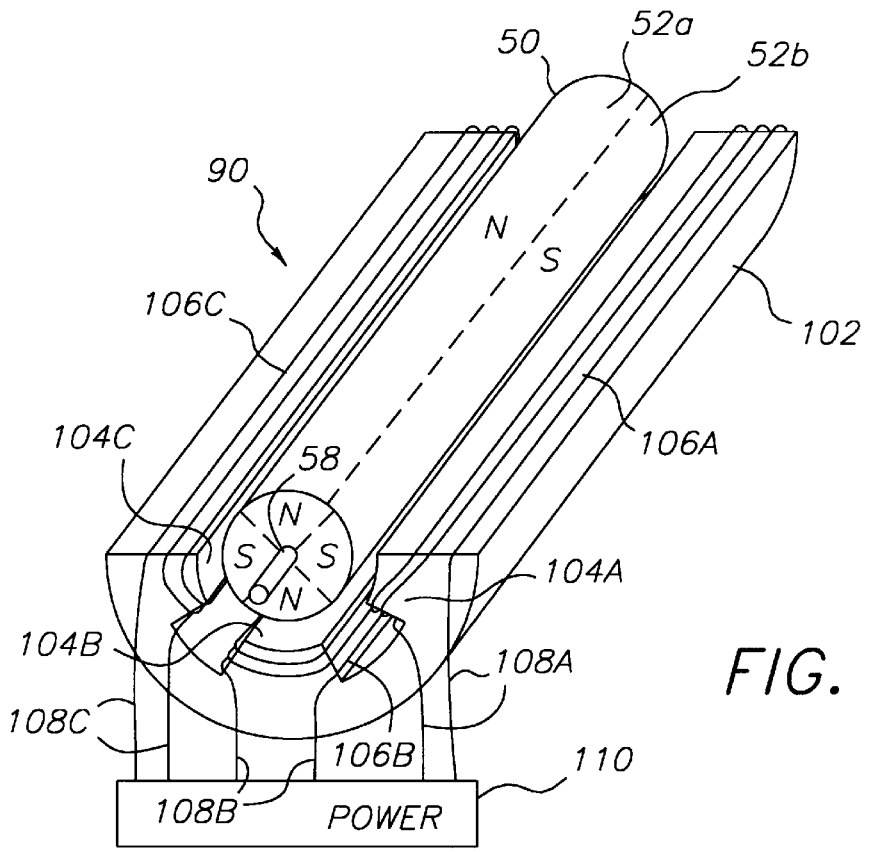
FIG. 2A is a perspective view of the bias field device of the present invention.

Referring to FIGS. 2A, and 2B, a bias field device 90 and bias magnet 50 of the present invention are illustrated, respectively. The bias field device 90 comprises a magnet 50, a ferromagnetic stator member 102 with stator pole teeth 104A, 104B, and 104C, and coils 106A, 106B, 106C. The magnet 50 is polarized with a plurality of radially disposed surface poles (denoted by N & S) of alternating north and south polarity around its circumference. In the preferred embodiment, the magnet 50 has four poles 52a, 52b, 52c and 52d as shown in FIG. 1B. The magnet 50 further comprises axle members 58 which are fixedly attached as shown in FIG. 2B.

The ferromagnetic stator member 102 has coils 106A, 106B and 106C wrapped around the stator pole teeth 104A, 104B, and 104C, respectively. The power source 110 supplies power to the coils 106A, 106B and 106C through conductors 108A, 108B and 108C, respectively as shown. The ferromagnetic stator member 102 is preferably formed from a soft magnetic material including either permalloy, supermalloy, sendust, iron, nickel, nickel-iron or alloys thereof.

Figure 3:
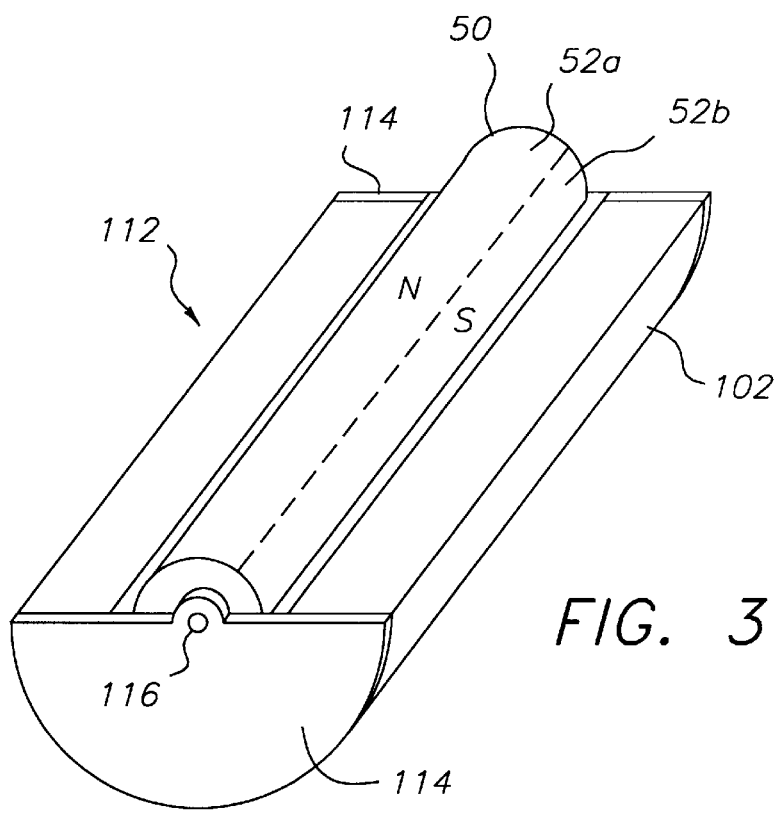
FIG. 3 is a perspective view of the bias field device with end support members.

Referring to FIG. 3, a perspective is shown of a support structure 112 comprising the ferromagnetic element 102, end support members 114 and bias magnet 50. The end support members 114 are fixedly attached to the ferromagnetic element 102 as shown. The end support members 114 have bearings 116 for receiving axle members 58 of bias magnet 50 (FIG. 2B). Thus the bias magnet 50 is mounted for rotation about it longitudinal axis with its axle members free to rotate in bearings 116.

Figure 4A:
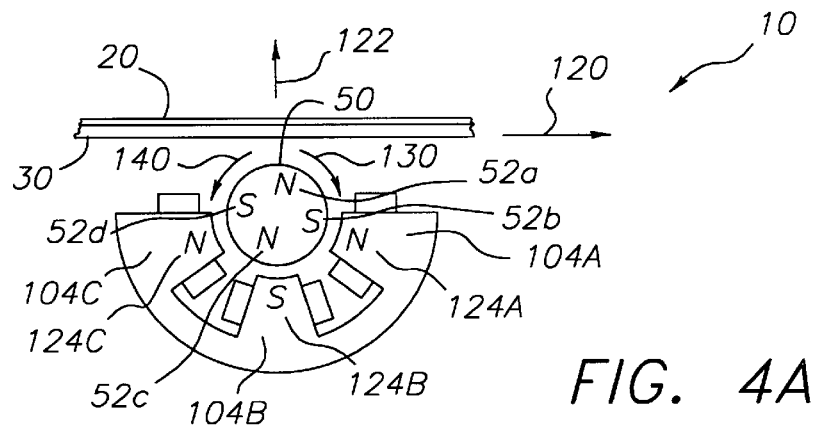
FIG. 4A is a cross-sectional view of the bias field apparatus taken along line A—A of FIG. 1A illustrating the bias magnet in a first bias position.
Figure 4B:
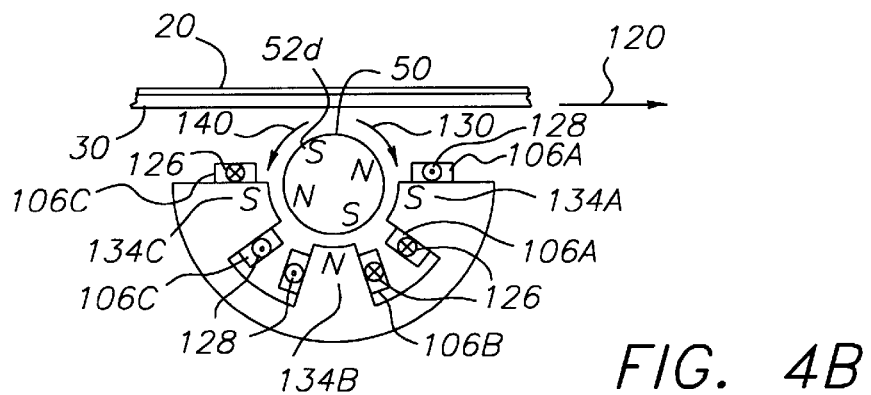
FIG. 4B is a cross-sectional view of the bias field device taken along line A—A of FIG. 1A illustrating the bias magnet undergoing rotation from a first to a second bias position.
Figure 4C:
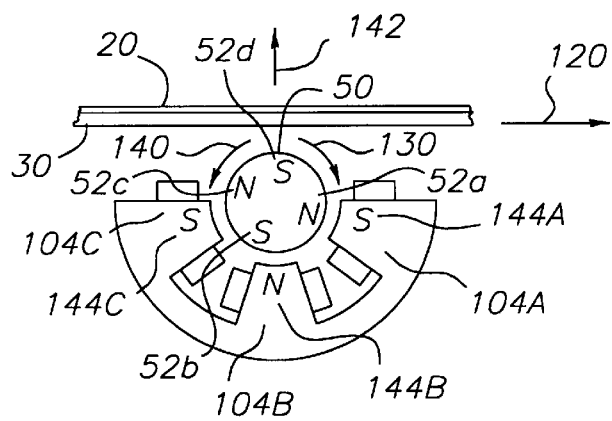
FIG. 4C is a cross-sectional view of the bias field apparatus taken along line A—A of FIG. 1A illustrating the bias magnet in the second bias position.

FIGS. 4A, 4B and 4C are cross-sectional views of the bias field device taken along line A—A of FIG. 1 illustrating the operation and field inversion of the bias field device 90. For purposes of illustration, the disk 10 is rotating in the direction illustrated by the arrow 120. In FIG. 4A, the magnet 50 is in a first bias position with its north pole 52a adjacent to the disk 10 thereby producing an upward directed magnetic field across recording layer 20 as indicated by field vector 122. The poles 52b, 52c and 52d are adjacent stator pole teeth 104A, 104B, and 104C, respectively as shown. The poles 52b, 52c and 52d of magnet 50 induce a north pole 124A, a south pole 124B, and a north pole 124C in stator pole teeth 104A, 104B, and 104C, respectively as shown. The rotation of disk 10 causes the conductive substrate 30 to impart a first torque on the magnet 50 which tends to rotate the magnet 50 clockwise as illustrated by rotation arrow 130. The magnet 50 is held stationary in the first bias position by the presence of the north pole 124A, the south pole 124B, and the north pole 124C in stator pole teeth 104A, 104B, and 104C, respectively which impart a second torque that tends to rotate the magnet counterclockwise as indicated by the rotation arrow 140. The first and second torques are of equal magnitude and therefore there is no rotation of magnet 50. It is instructive to note that the coils 106A, 106B and 106C which are wrapped around the stator pole teeth 104A, 104B, and 104C, respectively of ferromagnetic element 102, are de-energized when it is desired to have the magnet 50 stationary.

When rotation of the magnet 50 is desired, the coils 106A, 106B and 106C are energized by power source 110 (FIG. 2A) as shown in FIG. 4B. The current flows through the coils 106A, 106B and 106C as indicated by conventional current arrows 126 and 128 with current arrow 126 indicating that current is going into the page and current arrow 128 indicating that current is going out of the page. This current induces a south pole 134A, a north pole 134B, and a south pole 134C in the stator pole teeth 104A, 104B, and 104C, respectively. The south pole 134A, north pole 134B, and south pole 134C impart a clockwise torque to magnet 50 as does the rotation of conductive substrate 30. Therefore, the magnet 50 undergoes rotation as indicated by rotation arrow 130 from the first bias position with its north pole 52a adjacent to disk 10 to a second bias position with is south pole 52d adjacent to disk 10 as shown in FIG. 4C. The current is on just long enough to implement the rotation.

Referring to FIG. 4C, the magnet 50 is in a second bias position with its south pole 52d adjacent to the disk 10 thereby producing a downwardly directed magnetic field across recording layer 20 as indicated by field vector 142. The poles 52a, 52b and 52c are adjacent stator pole teeth 104A, 104B, and 104C, respectively as shown. The poles 52a, 52b and 52c of magnet 50 induce a south pole 144A, a north pole 144B, and a south pole 144C in stator pole teeth 104A, 104B, and 104C of ferromagnetic element 102, respectively as shown. The rotation of disk 10 causes the conductive substrate 30 to impart a first torque to the magnet 50 which tends to rotate the magnet 50 clockwise as illustrated by rotation arrow 130. The magnet 50 is held stationary in the first bias position by the presence of the south pole 144A, the north pole 144B, and the south pole 144C in stator pole teeth 104A, 104B, and 104C, respectively of ferromagnetic element 102 which impart a second torque that tends to rotate the magnet counterclockwise as indicated by the rotation arrow 140. The first and second torques are of equal magnitude and therefore there is no rotation of magnet 50. It is instructive to note that the coils 106A, 106B and 106C which are wrapped around the stator pole teeth 104A, 104B, and 104C, respectively, of ferromagnetic element 102, are de-energized when it is desired to have the magnet 50 stationary. It is obvious to those skilled in the art that the magnet can be rotated to its first bias position with its north pole adjacent to the disk 10 by energizing the coil as described in FIG. 4B with the direction of current opposite to that shown in FIG. 4B.

The invention has been described with reference to a preferred embodiment. However, it will be appreciated that variations and modifications can be effected by a person of ordinary skill in the art without departing from the scope of the invention.

Parts List:
10 disk
20 recording layer
30 substrate
35 laser source
50 magnet
52*a* north pole
52*b* south pole
52*c* north pole
52*d* south pole
54 field vector
58 axle member
90 bias field device
102 ferromagnetic stator member
104A stator pole tooth
104B stator pole tooth
104C stator pole tooth
106A coil
106B coil
106C coil
108A conductor
108B conductor
108C conductor
110 power source
112 support member
114 end support member
116 bearing
122 field vector
124A north pole
124B south pole
124C north pole
126 current arrow
128 current arrow
130 rotation arrow
134A south pole
134B north pole
134C south pole
140 rotation arrow
142 field vector
144A south pole
144B north pole
144C south pole

What is claimed is:

1. A bias-field apparatus for a magneto-optical system having a magneto-optical recording element which includes a conductive substrate and which moves through a magnetic field created by the bias-field device so that information is selectively recorded on or erased from the recording element, the device comprising:
   (a) a support member;
   (b) a magnet mounted for rotation in said support member such that, when the recording element rotates, the conductive substrate creates a magnetic coupling with the magnet for causing said magnet to rotate; and
   (c) a ferromagnetic element enclosing a portion of said magnet and having a plurality of spatially separated pole teeth, each of said pole teeth having an operably connected coil disposed thereon that releases said magnet for rotation caused by the conductive substrate when the coil is energized, and prevents rotation when said coil is de-energized by magnetic coupling of the ferromagnetic element and the magnet for permitting said magnet to be selectively rotated.

2. The bias field device as in claim 1, wherein said ferromagnetic element is formed from a soft magnetic material including either permalloy, supermalloy, sendust, iron, nickel, nickel-iron or alloys thereof.

3. The bias field device as in claim 2, wherein direction of rotation of said magnet is dependent on the direction of rotation of the recording element.

4. The bias field device as in claim 1, wherein said conductive substrate is a conductive metal.

5. The bias field device as in claim 4, wherein said magnet is bi-polar.

6. The bias field device as in claim 4, wherein said magnet includes a plurality of poles.

7. The bias field device as in claim 1, wherein said ferromagnetic element partially encloses said magnet so that a portion of said magnet adjacent the magneto-optical recording element is not enclosed by said ferromagnetic element for permitting efficient magnetic coupling of said magnet and the conductive substrate.

8. A method for operating a bias-field device for a magneto-optical system having a magneto-optical recording element which includes a conductive substrate and which moves through a magnetic field created by the bias-field device so that information is selectively recorded on or erased from the recording element, the method comprising the steps of:
   (a) providing a support member;
   (b) mounting a magnet for rotation about its axis in the support member so that when the recording element rotates the conductive substrate creates a magnetic coupling with the magnet for causing said magnet to rotate;
   (c) providing a ferromagnetic element enclosing a portion of the magnet and having a plurality of spatially separated pole teeth, each of the pole teeth having an operably connected coil disposed thereon that releases the magnet for rotation caused by the conductive substrate when the coil is energized, and prevents rotation when the coil is de-energized by magnetic coupling of the ferromagnetic element and the magnet for permitting the magnet to be selectively rotated.

9. The method as in claim 8, wherein step (a) includes rotating the magnet in the direction of rotation of the conductive substrate.

10. The method as in claim 8, wherein step (b) includes providing a bi-polar magnet.

11. The method as in claim 8, wherein step (b) includes providing a plurality of poles.

12. The method as in claim 11, wherein step (c) includes partially enclosing the magnet so that a portion of the magnet adjacent the magneto-optical recording element is not enclosed by the ferromagnetic element for permitting efficient magnetic coupling of the magnet and the conductive substrate.

* * * * *